(12) United States Patent
Huo

(10) Patent No.: US 11,785,221 B2
(45) Date of Patent: *Oct. 10, 2023

(54) ENCODING AND DECODING METHOD, APPARATUS AND COMMUNICATION SYSTEM

(71) Applicant: GUANGDONG OPPO MOBILE TELECOMMUNICATIONS CORP., LTD., Guangdong (CN)

(72) Inventor: Junyan Huo, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,859

(22) Filed: May 3, 2022

(65) Prior Publication Data

US 2022/0264100 A1 Aug. 18, 2022

Related U.S. Application Data

(63) Continuation of application No. 17/228,558, filed on Apr. 12, 2021, now Pat. No. 11,388,407, which is a (Continued)

(51) Int. Cl.
*H04N 19/105* (2014.01)
*H04N 19/119* (2014.01)
(Continued)

(52) U.S. Cl.
CPC ......... *H04N 19/132* (2014.11); *H04N 19/105* (2014.11); *H04N 19/119* (2014.11); *H04N 19/159* (2014.11); *H04N 19/176* (2014.11)

(58) Field of Classification Search
None
See application file for complete search history.

(56) References Cited

U.S. PATENT DOCUMENTS 6,452,969 B1 * 9/2002 Yim ................. H04N 19/51
375/E7.206
9,813,709 B2 11/2017 Matsuo et al.
(Continued)

FOREIGN PATENT DOCUMENTS

CN 103460700 A 12/2013
CN 102695061 B 1/2015
(Continued)

OTHER PUBLICATIONS

Kondo, Kenji et al JVET-Q0161 On constant shift and offset in MIP Joint Video Experts Team (JVET) of ITU-T SG 16 WP 3 and ISO/IEC JTC 1/SC 29/WG 11 17th Meeting: Brussels, BE, Jan. 7-17, 2020 Jan. 17, 2020(Jan. 01, 2020) the whole document.
(Continued)

*Primary Examiner* — Mohammad J Rahman
(74) *Attorney, Agent, or Firm* — PERKINS COIE LLP

(57) ABSTRACT

A method for predicting an image is provided. The method include (i) determining prediction parameters of a current block in a bitstream; (ii) determining a matrix-based intra prediction (MIP) input sample of the current block based on neighboring samples of the current block and the prediction parameters; (iii) setting a shifting number parameter (sW) as a first fixed value; (iv) setting a shifting offset parameter (fO) as a second fixed value; and (v) determining an MIP prediction sample of the current block based on an MIP weighting matrix, the MIP input sample, the shifting offset parameter (fO), and the shifting number parameter (sW).

20 Claims, 14 Drawing Sheets

Related U.S. Application Data continuation of application No. PCT/CN2020/117911, filed on Sep. 25, 2020.

(60) Provisional application No. 62/911,166, filed on Oct. 4, 2019.

(51) Int. Cl.
  *H04N 19/132* (2014.01)
  *H04N 19/159* (2014.01)
  *H04N 19/176* (2014.01)

(56) References Cited

U.S. PATENT DOCUMENTS

| | | | |
|---|---|---|---|
| 10,666,976 | B2 | 5/2020 | Huang et al. |
| 2008/0260031 | A1 | 10/2008 | Karczewicz |
| 2009/0002379 | A1 | 1/2009 | Baeza |
| 2009/0003447 | A1 | 1/2009 | Christoffersen |
| 2010/0098173 | A1 | 4/2010 | Horiuchi |
| 2012/0218432 | A1 | 8/2012 | Liu |
| 2013/0251036 | A1 | 9/2013 | Lee |
| 2014/0241427 | A1 | 8/2014 | Wang et al. |
| 2014/0369411 | A1 | 12/2014 | Ogawa |
| 2015/0124865 | A1 | 5/2015 | Kim et al. |
| 2015/0245021 | A1 | 8/2015 | Matsuo et al. |
| 2017/0104993 | A1 | 4/2017 | Jeong et al. |
| 2017/0295380 | A1 | 10/2017 | Huang et al. |
| 2017/0359595 | A1 | 12/2017 | Zhang et al. |
| 2018/0098065 | A1* | 4/2018 | Karczewicz ........... H04N 19/14 |
| 2018/0343455 | A1 | 11/2018 | Jang et al. |
| 2019/0037213 | A1 | 1/2019 | Hermansson et al. |
| 2019/0149822 | A1 | 5/2019 | Kim et al. |
| 2019/0166375 | A1 | 5/2019 | Jun et al. |
| 2019/0273920 | A1* | 9/2019 | Zhao ................... H04N 19/182 |
| 2020/0382812 | A1* | 12/2020 | Kawai ................. H04N 19/176 |
| 2021/0281838 | A1 | 9/2021 | Lee et al. |
| 2021/0306638 | A1 | 9/2021 | Kang et al. |

FOREIGN PATENT DOCUMENTS

| | | |
|---|---|---|
| CN | 109076221 A | 12/2018 |
| CN | 109076243 A | 12/2018 |
| WO | 2018134128 A1 | 7/2018 |
| WO | 2019172676 A1 | 9/2019 |
| WO | 2019174389 A1 | 9/2019 |

OTHER PUBLICATIONS

Huo, Junyan et al. JVET-Q0450 On fixed sW and fO in MIP Joint Video Experts Team (JVET) of ITU-T SG 16 WP 3 and ISO/IEC JTC 1/SC 29/WG 11 17th Meeting: Brussels, BE, Jan. 7-17, 2020 Jan. 17, 2020(Jan. 17, 2020) the whole document.

Pfaff, Jonathan et al. JVET-Q0446 MIP with constant shifts and offsets Joint Video Experts Team (JVET) of ITU-T SG 16 WP 3 and ISO/IEC JTC 1/SC 29/WG 11 17th Meeting: Brussels, BE, Jan. 7-17, 2020 Jan. 17, 2020(Jan. 17, 2020) the whole document.

Kondo, Kenji et al. JVET-P0056 CE3-2: On rounding shift of MIP Joint Video Experts Team (JVET) of ITU-T SG 16 WP3 and ISO/IEC JTC 1/SC 29/WG 11 16th Meeting: Geneva, CH, Oct. 1-11, 2019 Oct. 11, 2019(Oct. 11, 2019) pp. 1-2.

Huo, Junyan et al. JVET-P0136 Non-CE3: MIP Simplification Joint Video Experts Team (JVET) of ITU-T SG 16 WP3 and ISO/IEC JTC 1/SC 29/WG 11 16th Meeting: Geneva, CH, Oct. 1-11, 2019 Oct. 11, 2019(Oct. 11, 2019) pp. 1-3.

International Search Report in the international application No. PCT/CN2020/117911, dated Dec. 21, 2020.

English translation of the Written Opinion of the International Search Authority in the international application No. PCT/CN2020/117911, dated Dec. 21, 2020.

Biatek (Qualcomm) T et al: "Non-CE3: simplified MIP with power-of-two offsets", 16. JVET Meeting; Oct. 1, 2019-Oct. 11, 2019; Geneva; (the Joint Video Exploration Teamof ISO/IEC JTC1/SC29/WG11 and ITU-T SG.16), No. JVET-P0625 m506122 Oct. 2019 (Oct. 12, 2019), XP030217890, Retrieved from the Internet: URL: http://phenix.int-evry.fr/jvet/doc_end_user/documents/16_Geneva/wg11/JVET-P0625-v2.zip JVET-P0625-V2.docx[retrieved on Oct. 2, 2019] abstract Section 2.

Bross B et al: "Versatile Video Coding(Draft 6)", 15. JVET Meeting; Jul. 3, 2019-Jul. 12, 2019; Gothenburg: (the Joint Video Explorationteam of ISO/IEC JTC1/SC29/WG11 and ITU-T SG.16), No. JVET-O2001-vE; JVET-O2001 Jul. 31, 2019 (Jul. 31, 2019), pp. 1-455, XP030293944, Retrieved from the Internet: URL: https://jvet-experts.org/doc_end_user/documents/15_Gothenburg/wg11/JVET-O2001-v14. zip JVET-O2001-vE. docx[retrieved on Jul. 31, 2019] Sections 8.4.5.2.1-8.4.5.2.4.

Supplementary European Search Report in the European application No. 20841841.8, dated Jul. 26, 2021.

Kondo (Sony) K et al: "CE3-2: on rounding shift of MIP", 16. JVET Meeting: Oct. 1, 2019-Oct. 11, 2019; Geneva; (The Joint Video Exploration Teamof ISO/IEC JTC1/SC29/WG11 and ITU-T SG.16), No. JVET-P0056 ; m49976 Sep. 18, 2019 (Sep. 18, 2019), XP030216081, Retrieved from the Internet: URL: http://phenix.int-evry. fr/jvet/doc_end_user/documents/16_Geneva/wg11/JVET-P0056-v1. zip JVET-P0056-V1/JVET-P0056-v1. docx [retrieved on Sep. 18, 2019], abstract Sections 1, 2.

Filippov Alexey et al, "Recent Advances in Intra Prediction for the Emerging H.266/VVC Video Coding Standard", 2019 International Multi-Conference on Engineering, Computer and Information Sciences (SIBIRCON), IEEE, Oct. 21, 2019 (Oct. 21, 2019), pp. 525-530.

First Office Action of the European application No. 20841841.8, dated Jan. 3, 2022.

Non-Final Office Action of the U.S. Appl. No. 17/228,558, dated Jun. 21, 2021.

Final Office Action of the U.S. Appl. No. 17/228,558, dated Oct. 12, 2021.

Notice of Advisory Action of the U.S. Appl. No. 17/228,558, dated Dec. 29, 2021.

Notice of Allowance of the U.S. Appl. No. 17/228,558, dated Feb. 10, 2022.

First Office Action of the Canadian application No. 3109298, dated May 2, 2022. 5 pages.

Second Office Action of the European application No. 20841841.8, dated May 9, 2022. 4 pages.

Office Action of the Indian application No. 202117016172, dated Jun. 8, 2022. 5 pages with English translation.

First Office Action of the Chinese application No. 202011339504.8, dated Jun. 28, 2022. 22 pages with English translation.

Second Office Action of the Chinese application No. 202011339504.8, dated Dec. 5, 2022. 18 pages with English translation.

Second Office Action of the Canadian application No. 3109298, dated Jan. 25, 2023. 3 pages.

First Office Action of the Indonesian application No. P00202102035, dated Mar. 29, 2023.

First Office Action of the Israeli application No. 280722, dated Jun. 15, 2023. 4 pages.

\* cited by examiner

ENCODING AND DECODING METHOD, APPARATUS AND COMMUNICATION SYSTEM

CROSS-REFERENCE TO RELATED APPLICATIONS

This is a continuation of U.S. application Ser. No. 17/228,558 filed on Apr. 12, 2021, which is a continuation application of International Application No. PCT/CN2020/117911 filed on Sep. 25, 2020, which claims the benefit of and priority to U.S. Provisional Application No. 62/911,166, filed Oct. 4, 2019, the contents of which are incorporated herein by reference in their entireties.

TECHNICAL FIELD

The present disclosure relates to the field of telecommunication technologies, and in particular, to a method for encoding and decoding images such as pictures or videos.

BACKGROUND

Versatile Video Coding (VVC) is a next generation video compression standard used to replace a current standard such as High Efficiency Video Coding standard (H.265/HEVC). The VVC coding standard provides higher coding quality than the current standard. To achieve this goal, various intra and inter prediction modes are considered. When using these prediction modes, a video can be compressed such that data to be transmitted in a bitstream (in binary form) can be reduced. Matrix-based intra prediction (MIP) is one of these modes. The MIP is an intra prediction mode. When implementing under the MIP mode, an encoder or a decoder can derive an intra prediction block based on a current coding block (e.g., a group of bits or digits that is transmitted as a unit and that may be encoded and/or decoded together). However, deriving such prediction blocks may require significant amount of computational resources and additional storage spaces. Therefore, an improved method for addressing this issue is advantageous and desirable.

SUMMARY

When implementing an MIP process, various prediction parameters are determined and then utilized. Traditionally, a few of these prediction parameters can be determined by look-up tables. These look-up tables need to be stored in a component (e.g., a memory, a cache, etc.) of an encoder and/or a decoder and thus require storage spaces. In addition, accessing these look-up tables consumes computing time and resources. Therefore, it is advantageous to have an improved method, apparatus, and system to address the foregoing issue.

The present disclosure provides a method for predicting, encoding, and/or decoding an image based on an MIP process. The MIP process can generate a prediction block of a current block, and the size of the prediction block is smaller than the size of the current block. For example, an "8×8" current block can have a "4×4" prediction block. An MIP prediction block with its size smaller than the current block is derived by performing a matrix calculation, which consumes less computational resources than performing the matrix calculation with a larger block. After the matrix calculation, an upsampling process is applied to the MIP prediction block to derive an intra prediction block that is of the same size of the current block. For example, an "8×8" intra prediction block can be derived from a "4×4" MIP prediction block by invoking the upsampling process of interpolation and/or extrapolation.

More particularly, the present method includes, for example, (i) determining prediction parameters of a current block in a bitstream; (ii) determining an MIP input sample (e.g., "p[x]" in equations (P-1), (P-2), and (P-3) discussed in detail below) of the current block based on neighboring samples of the current block and the prediction parameters; (iii) setting a shifting number parameter (e.g., "sW" in equation (B) discussed in detail below) as a first fixed value; (iv) setting a shifting offset parameter (e.g., "fO" in equation (B) discussed in detail below) as a second fixed value; (v) determining an MIP weighting matrix of the current block based on the prediction parameters; (vi) determining an MIP prediction sample (e.g., "predMip[x][y]" in equation (C) discussed in detail below) of the current block based on the MIP weighting matrix, the MIP input sample, the shifting offset parameter (fO), and the shifting number parameter (sW); and (vii) performing an upsampling process to the MIP prediction sample so as to generate intra predicted samples (e.g., "predSamples[x][y]" in equation (G) discussed in detail below) of the current block.

Without wishing to be bounded by theory, setting either or both of the shifting number parameter and the shifting offset parameter as fixed values effectively improves the overall encoding/decoding efficiency without significantly affecting the accuracy of the encoding/decoding processes. By this arrangement, the present methods provide a solution to significantly shorten computing time and reduce required storage space when implementing MIP processes.

Another aspect of the present disclosure includes a system for encoding/decoding pictures and videos. The system can include an encoding sub-system (or an encoder) and a decoding sub-system (or a decoder). The encoding sub-system includes a partition unit, a first prediction unit, and an entropy coding unit. The partition unit is configured to receive an input video and divide the input video into one or more coding units (CUs). The first intra prediction unit is configured to generate a prediction block corresponding to each CU based on prediction parameters derived from encoding the input video. The entropy coding unit is configured to transform the parameters for deriving the prediction block into a bitstream. The decoding sub-system includes a parsing unit and a second intra prediction unit. The parsing unit is configured to parse the bitstream to get numerical values (e.g., values associated with the one or more CUs). The second intra prediction unit is configured to convert the numerical values into an output video based on the prediction parameters.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

DETAILED DESCRIPTION

In order to facilitate the understanding of the present disclosure, the present disclosure will be described more fully hereinafter with reference to the accompanying drawings.

Figure 1A:
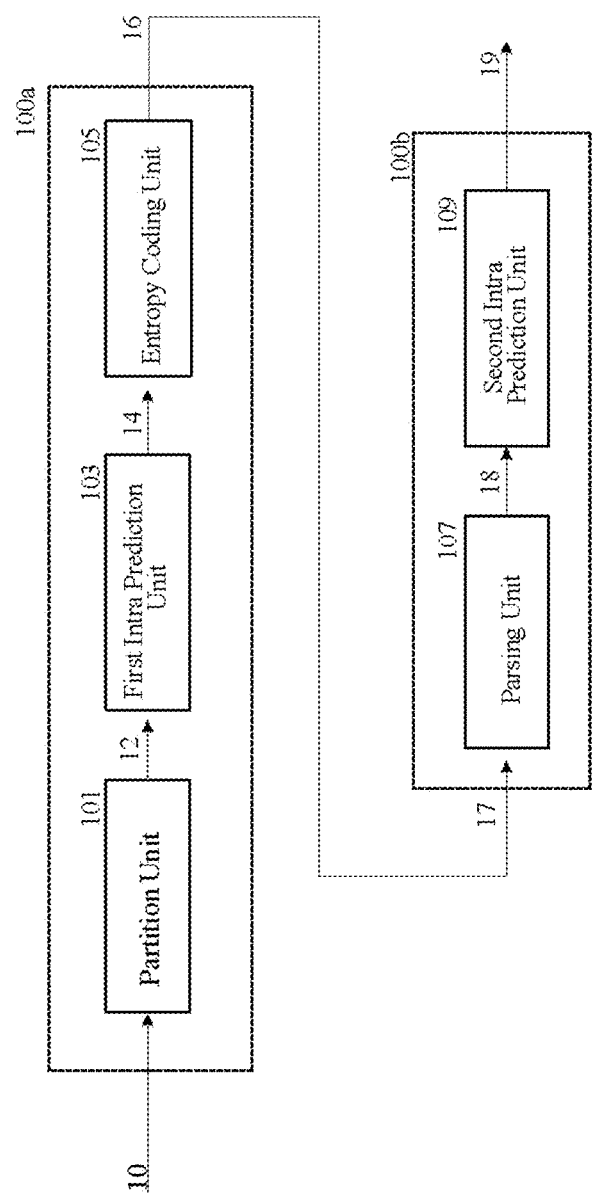
FIG. 1A is a schematic diagram of a system according to an embodiment of the present disclosure.

FIG. 1A is a schematic diagram of a system 100 according to an embodiment of the present disclosure. The system 100 can encode, transmit, and decode a picture. The system 100 can also be applied to encode, transmit and decode a video consisting of a sequence of pictures. More particularly, the system 100 can receive input pictures, process the input pictures, and generate output pictures. The system 100 includes an encoding apparatus 100a and a decoding apparatus 100b. The encoding apparatus 100a includes a partition unit 101, a first intra prediction unit 103, and an entropy coding unit 105. The decoding apparatus 100b includes a parsing unit 107 and a second intra prediction unit 109.

The partition unit 101 is configured to receive an input video 10 and then divide the input video 10 into one or more coding tree units (CTUs) or coding units (CUs) 12. The CUs 12 are transmitted to the first intra prediction unit 103. The first intra prediction unit 103 is configured to derive a prediction block for each of the CUs 12 by performing an MIP process. In some embodiments, based on the sizes of the CUs 12, the MIP process has different approaches to handle the CUs 12 with different sizes. For example, for each type of CUs 12, it has a designated MIP size identifier (e.g., 0, 1, 2, etc.).

The first intra prediction unit 103 first determines prediction parameters (e.g., a width, a height, a size, etc.) of the CU 12. Accordingly, the first intra prediction unit 103 can determine an MIP size identifier of the CU 12. The first intra prediction unit 103 further derives a group of reference samples for the CU 12 (e.g., using neighboring samples of the CU 12, such as above- or left-neighboring samples, discussed in detail with reference to FIG. 3). The first intra prediction unit 103 then derives an MIP prediction of the CU 12 based on the group of reference samples and a corresponding MIP weighting matrix. The first intra prediction unit 103 can use the MIP prediction as an intra prediction 14 of the CU 12. The intra prediction 14 and the prediction parameters for deriving the intra prediction 14 are then transmitted to the entropy coding unit 105 for further process.

The entropy coding unit 105 is configured to transform the prediction parameters for deriving the intra prediction 14 into binary form. Accordingly, the entropy coding unit 105 generates a bitstream 16 based on the intra prediction 14. In some embodiments, the bitstream 16 can be transmitted via a communication network or stored in a disc or a server.

The decoding apparatus 100b receives the bitstream 16 as input bitstream 17. The parsing unit 107 parses the input bitstream 17 (in binary form) and converts it into numerical values 18. The numerical values 18 is indicative of the characteristics (e.g., color, brightness, depth, etc.) of the input video 10. The numerical values 18 is transmitted to the second intra prediction unit 109. The second intra prediction unit 109 can then convert these numerical values 18 into an output video 19 (e.g., based on processes similar to those performed by the first intra prediction unit 103; relevant embodiments are discussed in detail with reference to FIG. 4). The output video 19 can then be stored, transmitted, and/or rendered by an external device (e.g., a storage, a transmitter, etc.). The stored video can further be displayed by a display.

Figure 1B:
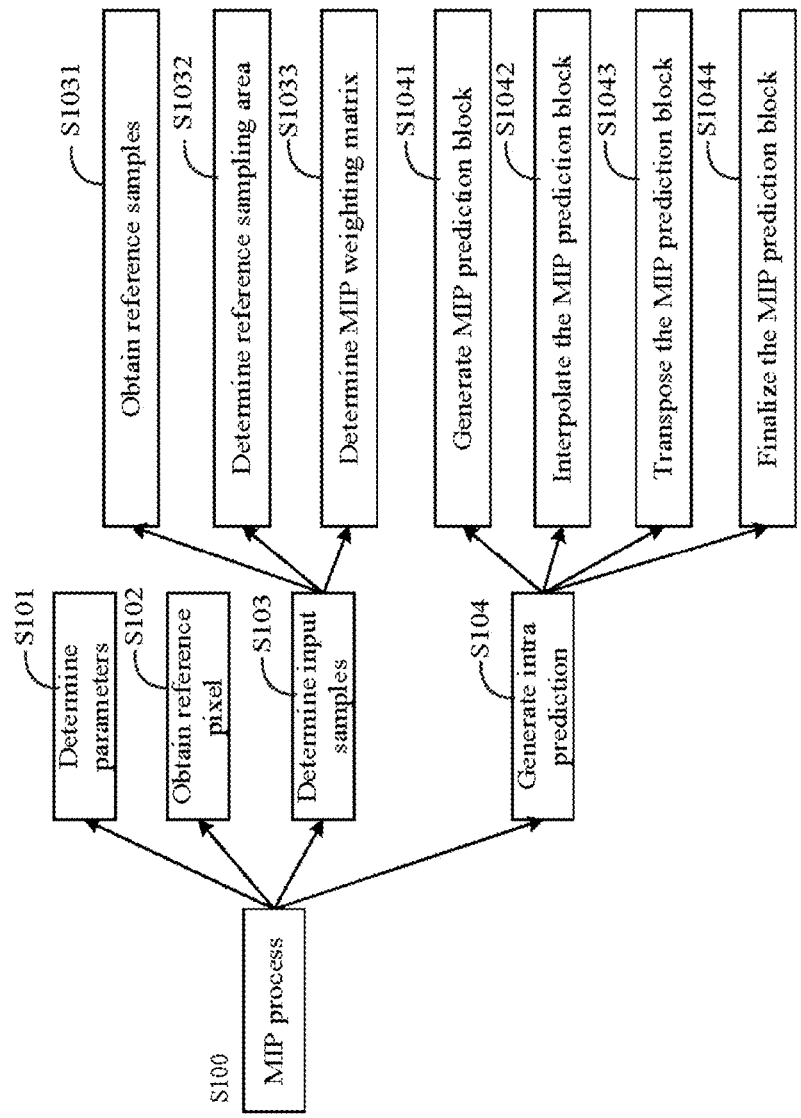
FIG. 1B is a schematic diagram illustrating an MIP process in accordance with embodiments of the present disclosure.

FIG. 1B is a schematic diagram illustrating an MIP process S100 in accordance with embodiments of the present disclosure. The MIP process includes four major steps S101, S102, S103, and S104. In step S101, prediction parameters for the MIP process S100 are to be determined. The prediction parameters include a type or size (e.g., indicated by an MIP size identifier, such as "mipSizeId") of a current block, the number of reference samples in each boundary (e.g., "boundySize"), the number of MIP input samples (e.g., "inSize"), and the dimension of an MIP prediction block (e.g., "predSize×predSize") generated by matrix multiplication. Based on the size of the current block, the MIP size identifier can be "0," "1," or "2," which is recorded in parameter "mipSizeId." Different blocks can have different prediction parameters.

In step S102, the MIP process obtains reference pixels. The references pixels can be from above-neighboring blocks and/or left-neighboring blocks. The pixels from the above-neighboring blocks are stored as parameter "refT" and the pixels from the left-neighboring blocks are stored as parameter "refL."

In step S103, input samples for the MIP process are determined. The input samples can be determined by three sub-steps, S1031, S1032, and S1033. In sub-step S1031, based on the reference pixels (e.g., from step S102), a downsampling process is performed to generate reference samples. In sub-step S1031, reference sampling areas (or buffer sampling areas) are determined. In some embodiments, a matrix transpose process can be involved in sub-step S1032. In sub-step S1033, a matrix multiplication calculation is performed based on the input samples.

In step S104, intra MIP prediction samples are generated. Step S104 includes four sub-steps, S1041, S1042, S1043, and S1044. In sub-step S1041, an MIP prediction block is generated based on an MIP weighting matrix, a shifting offset parameter (e.g., "fO"), and a shifting number parameter (e.g., "sW"). In the present disclosure, the shifting offset parameter and the shifting number parameter are set as fixed values. In sub-step S1042, an interpolation process is performed to the MIP prediction block. In sub-step S1043, the MIP prediction block is transposed. In sub-step S1044, the intra MIP prediction samples are generated. In some embodiments, the intra MIP prediction samples can be generated by considering the prediction samples from the above-neighboring pixels. In other embodiments, the intra MIP prediction samples can be generated without considering the prediction samples from the above-neighboring pixels (e.g., only considering the prediction samples from the left-neighboring pixels). Details of the MIP process are discussed below with reference to FIG. 3 and corresponding equations.

Figure 2:
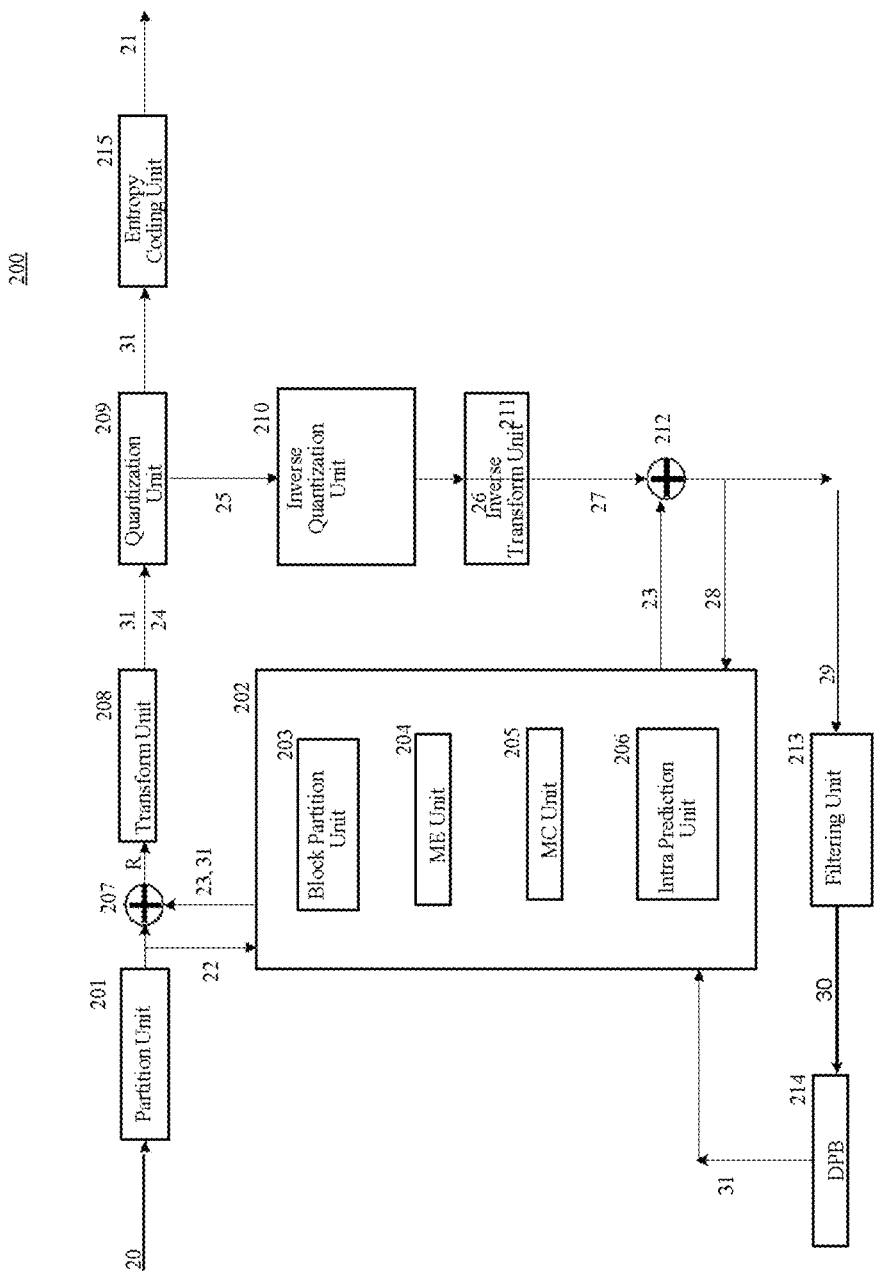
FIG. 2 is a schematic diagram of an encoding system according to an embodiment of the present disclosure.

FIG. 2 is a schematic diagram of an encoding system 200 according to an embodiment of the present disclosure. The encoding system 200 is configured to encode, compress, and/or process an input picture 20 and generate an output bitstream 21 in binary form. The encoding system 200 includes a partition unit 201 configured to divide the input picture 20 into one or more coding tree units (CTUs) 22. In some embodiments, the partition unit 201 can divide the picture into slices, tiles, and/or bricks. Each of the bricks can contain one or more integral and/or partial CTUs 22. In some embodiments, the partition unit 201 can also form one or more subpictures, each of which can contain one or more slices, tiles or bricks. The partition unit 201 transmits the CTUs 22 to a prediction unit 202 for further process.

The prediction unit 202 is configured to generate a prediction block 23 for each of the CTUs 22. The prediction block 23 can be generated based on one or more inter or intra prediction methods by using various interpolation and/or extrapolation schemes. As shown in FIG. 2, the prediction unit 202 can further include a block partition unit 203, an ME (motion estimation) unit 204, an MC (motion compensation) unit 205, and an intra prediction unit 206. The block partition unit 203 is configured to divide the CTUs 22 into smaller coding units (CUs) or coding blocks (CBs). In some embodiments, the CUs can be generated from the CTUs 22 by various methods such as quadtree split, binary split, and ternary split. The ME unit 204 is configured to estimate a change resulting from a movement of an object shown in the input picture 20 or a movement of a picture capturing device that generates the input picture 20. The MC unit 205 is configured to adjust and compensate a change resulting from the foregoing movement. Both the ME unit 204 and the MC unit 205 are configured to derive an inter (e.g., at different time points) prediction block of a CU. In some embodiments, the ME unit 204 and the MC unit 205 can use a rate-distortion optimized motion estimation method to derive the inter prediction block.

The intra prediction unit 206 is configured to derive an intra (e.g., at the same time point) prediction block of a CU (or a portion of the CU) using various intra prediction modes including MIP modes. Details of deriving of an intra prediction block using an MIP mode (referred to as "MIP process" hereinafter) is discussed with reference to FIG. 1B and FIG. 3. During the MIP process, the intra prediction unit 206 first derives one or more reference samples from neighboring samples of the CU, by, for example, directly using the neighboring samples as the reference samples, downsampling the neighboring samples, or directly extracting from the neighboring samples (e.g., Step 301 of FIG. 3).

Second, the intra prediction unit 206 derives predicted samples at multiple sample positions in the CU using the reference samples, an MIP matrix and a shifting parameter. The sample positions can be preset sample positions in the CU. For example, the sample positions can be positions with odd horizontal and vertical coordinate values within the CU (e.g., x=1, 3, 5, etc.; y=1, 3, 5, etc.). The shifting parameter includes a shifting offset parameter and a shifting number parameter, which can be used in shifting operations in generating the predicted samples. By this arrangement, the intra prediction unit 206 can generate predicted samples in the CU (i.e., "MIP prediction" or "MIP prediction block" refers to a collection of such predicted samples) (e.g., Step 302 of FIG. 3). In some embodiments, the sample positions can be positions with even horizontal and vertical coordinate values within the CU.

Figure 3:
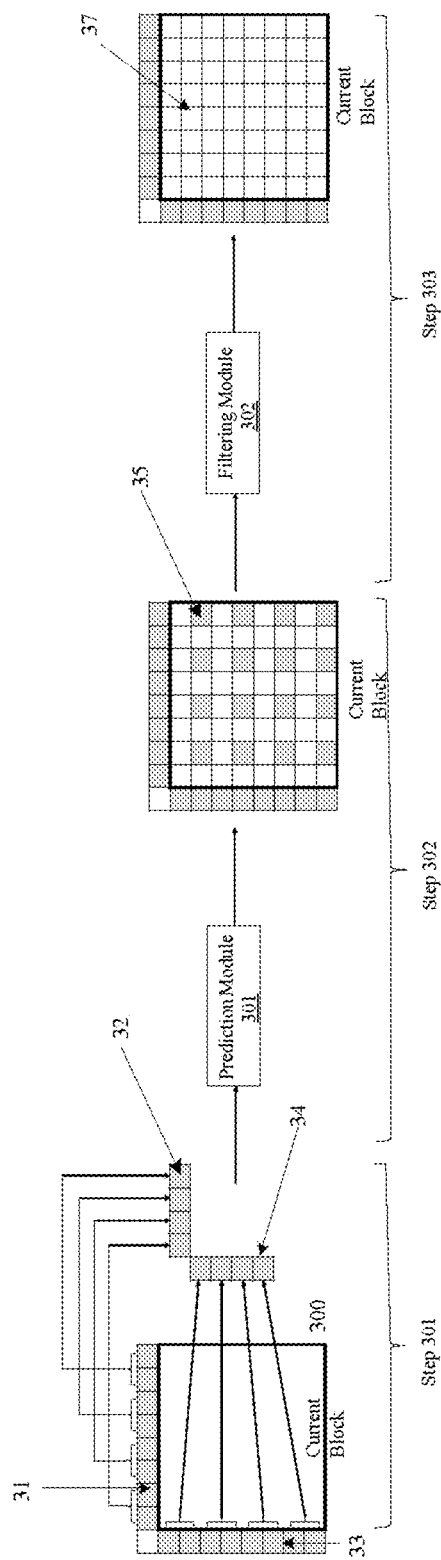
FIG. 3 is a schematic diagram illustrating derivation of an intra prediction block using an MIP mode in accordance with embodiments of the present disclosure.

Third, the intra prediction unit 206 can derive predicted samples at remaining positions (e.g., those are not sample positions) of the CU (e.g., Step 303 of FIG. 3). In some embodiments, the intra prediction unit 206 can use an interpolation filter to derive the predicted samples at the remaining positions. By the foregoing processes, the intra prediction unit 206 can generate the prediction block 23 for the CU in the CTU 22.

Referring to FIG. 2, the prediction unit 202 outputs the prediction block 23 to an adder 207. The adder 207 calculates a difference (e.g., a residual R) between the output (e.g., a CU in the CTUs 22) of the partition unit 201 and the output (i.e., the prediction block 23 of the CU) of the prediction block 202. A transform unit 208 reads the residual R, and performs one or more transform operations on the prediction block 23 to get coefficients 24 for further uses. A quantization unit 209 can quantize the coefficients 24 and outputs quantized coefficients 25 (e.g., levels) to an inverse quantization unit 210. The inverse quantization unit 210 performs scaling operations on the quantized coefficients 25 to output reconstructed coefficients 26 to an inverse transform unit 211. The inverse transform unit 211 performs one or more inverse transforms corresponding to the transforms in the transform unit 208 and outputs reconstructed residual 27.

An adder 212 then calculates reconstructed CU by adding the reconstructed residual 27 and the prediction block 23 of the CU from the prediction unit 202. The adder 212 also forwards its output 28 to the prediction unit 202 to be used as an intra prediction reference. After all the CUs in the CTUs 22 have been reconstructed, a filtering unit 213 can perform an in-loop filtering on a reconstructed picture 29. The filtering unit 213 contains one or more filters, for example, a deblocking filter, a sample adaptive offset (SAO) filter, an adaptive loop filter (ALF), a luma mapping with chroma scaling (LMCS) filter, a neural-network-based filter and other suitable filters for suppressing coding distortions or enhancing coding quality of a picture.

The filtering unit 213 can then send a decoded picture 30 (or subpicture) to a decoded picture buffer (DPB) 214. The DPB 214 outputs decoded picture 31 based on controlling information. The picture 31 stored in the DPB 214 may also be employed as a reference picture for performing inter or intra prediction by the prediction unit 202.

An entropy coding unit 215 is configured to convert the pictures 31, parameters from the units in the encoding system 200, and supplemental information (e.g., information for controlling or communicating with the system 200) into binary form. The entropy coding unit 215 can generate the output bitstream 21 accordingly.

In some embodiments, the encoding system 200 can be a computing device with a processor and a storage medium with one or more encoding programs. When the processor reads and executes the encoding programs, the encoding system 200 can receive the input picture 20 and accordingly generates the output bitstream 21. In some embodiments, the encoding system 200 can be a computing device with one or more chips. The units or elements of the encoding system 200 can be implemented as integrated circuits on the chips.

FIG. 3 is a schematic diagram illustrating an MIP process in accordance with embodiments of the present disclosure. The MIP process can be implemented by an intra prediction unit (e.g., the intra prediction unit 206). As shown in FIG. 3, the intra prediction unit can include a prediction module 301 and a filtering module 302. As also shown in FIG. 3, the MIP process includes three Steps 301, 302, and 303. The MIP process can generate a predicted block based on a current block or a coding block 300 (such as a CU or partitions of a CU).

Step 301

In Step 301, the intra prediction unit can use neighboring samples 31, 33 of the coding block 300 to generate reference samples 32, 34. In the illustrated embodiment, the neighboring samples 31 are above-neighboring samples, and the neighboring samples 33 are left-neighboring samples. The intra prediction unit 206 can calculate an average of the values of every two neighboring samples 31, 33 and set the average of the values as the values of the reference samples 32, 34, respectively. In some embodiments, the intra prediction unit 206 can select the value of one from every two neighboring samples 31 or 33 as the value of the reference sample 32 or 32. In the illustrated embodiments, the intra prediction unit 206 derives 4 reference samples 32 from 8 above-neighboring samples 31 of the coding block 300, and another 4 reference samples 34 from 8 left-neighboring samples 33 of the coding block 300.

In Step 301, the intra prediction unit determines a width and a height of the coding block 300 and denotes them as variables "cbWidth" and "cbHeight," respectively. In some embodiments, the intra prediction unit 206 can adopt a rate-distortion optimized mode decision process to determine an intra prediction mode (e.g., whether an MIP mode is used). In such embodiments, the coding block 300 can be partitioned into one or more transform blocks, whose width and height are noted as variables "nTbW" and "nTbH," respectively. When the MIP mode is used as the intra prediction mode, the intra prediction unit determines an MIP size identifier (denoted as variable "mipSizeId") based on the following conditions A-C.

[CONDITION A] If both "nTbW" and "nTbH" are 4, set "mipSizeId" as 0.

[CONDITION B] Otherwise, if either "cbWidth" or "cbHeight" is 4, set "mipSizeId" as 1.

[CONDITION C] Otherwise, set "mipSizeId" as 2.

As an example, if the size of the coding block 300 is "8×8" (i.e. both "cbWidth" and "cbHeight" are 8), then "mipSizeId" is set as 2. As another example, if the size of the transformed block of the coding block 300 is "4×4" (i.e. both "nTbW" and "nTbH" are 4), then "mipSizeId" is set as 0. As yet another example, if the size of the coding block 300 is "4×8," then "mipSizeId" is set as 1.

In the illustrated embodiments, there are three types of "mipSizeId," which are "0," "1," and "2." Each type of MIP size identifiers (i.e., variable "mipSizeId") corresponds to a specific way of performing the MIP process (e.g., use different MIP matrices). In other embodiments, there can be more than three types of MIP size identifiers.

Based on the MIP size identifier, the intra prediction unit can determine variables "(Size" and "predSize" based on the following conditions D-F.

[CONDITION D] If "mipSizeId" is 0, set "boundarySize" as 2 and "predSize" as 4.

[CONDITION E] If "mipSizeId" is 1, set "boundarySize" as 4 and "predSize" as 4.

[CONDITION F] If "mipSizeId" is 2, set "boundarySize" as 4 and "predSize" as 8.

In the illustrated embodiments, "boundarySize" represents a number of reference samples 32, 34 derived from each of the above-neighboring samples 31 and the left-neighboring samples 33 of the coding block 300. Variable "predSize" is to be used in a later calculation (i.e., equation (C) below).

In some embodiments, the intra prediction unit can also derive variable "isTransposed" to indicate the order of reference samples 32, 34 stored in a temporal array. For example, "isTransposed:" being "0" indicates that the intra prediction unit presents the reference samples 32 derived from the above-neighboring samples 31 of the coding block 300 ahead of the reference samples 34 derived from the left-neighboring samples 33. Alternatively, "isTransposed" being 1 indicates that the intra prediction unit presents the reference samples 34 derived from the left-neighboring samples 33 of the coding block 300 ahead of the reference samples 32 derived from the above-neighboring samples 31. In an implementation of the encoding system 200, the value of "isTransposed" is sent to an entropy coding unit (e.g., the entropy coding unit 215) as one of the parameters of the MIP process that is coded and written into a bitstream (e.g., the output bitstream 21). Correspondingly, in an implementation of a decoding system 400 in FIG. 4 described in this disclosure, the value of "isTransposed" can be received from a parsing unit (e.g., parsing unit 401) by parsing an input bitstream (which can be the output bitstream 21).

The intra prediction unit can further determine a variable "inSize" to indicate the number of reference samples 32, 34 used in deriving an MIP prediction. A value of "inSize" is determined by the following equation (A). In this disclosure, meanings and operations of all operators in equations are the same as the counterpart operators that are defined in the ITU-T H.265 standard.

$$\text{inSize}=(2*\text{boundarySize})-(\text{mipSizeId}==2)?1:0; \quad (A)$$

For example, "==" is a relational operator "Equal to". For example, if "mipSizeId" is 2, then "inSize" is 7 (calculated by (2*4)−1). If "mipSizeId" is 1, then "inSize" is 8 (calculated by (2*4)−0). In some embodiments, the parameter "inSize" can be found in Size-Id Table below.

TABLE

| | Size-Id | | |
|---|---|---|---|
| mipSizeId | boundarySize | inSize | predSize |
| 0 | 2 | 4 | 4 |
| 1 | 4 | 8 | 4 |
| 2 | 4 | 7 | 8 |

The intra prediction unit can invoke the following process to derive a group of reference samples 32, 34, which are stored in array p[x] ("x" is from "0" to "inSize−1"). The intra prediction unit can derive "nTbW" samples from the above-neighboring samples 31 of the coding block 300 (and store them in array "refT") and "nTbH" samples from the left-neighboring samples 33 (and store them in array "refL") of the coding block 300.

The intra prediction unit can initial a downsampling process on "refT" to get "boundarySize" samples and store the "boundarySize samples" in "refT." Similarly, the intra prediction unit 206 can initiate the downsampling process on "refL" to get "boundarySize" samples and store the "boundarySize" samples in "refL."

In some embodiments, the intra prediction unit can incorporate arrays "refT" and "refL" into a single array "pTemp" based on the order indicated by a variable "isTransposed." The intra prediction unit can derive "isTransposed" to indicate the order of reference samples stored in a temporal array "pTemp." For example, "isTransposed" being "0" (or FALSE) indicates that the intra prediction unit presents the reference samples 32 derived from the above-neighboring samples 31 of the coding block 300 ahead of the reference samples 34 derived from the left-neighboring samples 33. In other cases, "isTransposed" being "1" (or TRUE) indicates that the intra prediction unit presents the reference samples 34 derived from the left-neighboring samples 33 of the coding block 300 ahead of the reference samples 32 derived from the above-neighboring samples 31. In some embodiments, in an implementation of the encoding system 200, the intra prediction unit can determine a value of "isTransposed" by using a rate-distortion optimization method. In some embodiments, in an implementation of the encoding system 200, the intra prediction unit can determine the value of "isTransposed" based on comparisons and/or correlations between neighboring samples 32, 34 and the coding block 300. In an implementation of the encoding system 200, the value of "isTransposed" can be forwarded to the entropy coding unit (e.g., the entropy coding unit 215) as one of the parameters of the MIP process to be written in the bitstream (e.g., the output bitstream 21). Correspondingly, in an implementation of a decoding system 400 in FIG. 4 described in this disclosure, the value of "isTransposed" can be received from a parsing unit (e.g. parsing unit 401) by parsing an input bitstream (which can be the output bitstream 21).

In some embodiments, the parameter "mipSizeId" can be used to determine whether a selected size parameter of a current block is in a predetermined range. More particularly, "mipSizeId" equal to "0" or "1" means that the selected size parameter is within the predetermined range. If "mipSizeId" is equal to "2," it means that the selected size parameter is not within the predetermined range. In other words, the MIP input sample can be determined based on a buffer area (e.g., "pTemp"), the MIP size identifier (e.g., "mipSizeId"), a bit depth of the neighboring samples (e.g., "BitDepth"), as discussed in detailed below.

The intra prediction unit can determine array "p[x]" (x from "0" to "inSize−1") based on the following conditions G and H.

[CONDITION G] If "mipSizeId" is 2, p[x]=pTemp[x+1]−pTemp[0].

[CONDITION H] Otherwise (e.g., "mipSizeId" is less than 2), p[0]=pTemp[0]−(1<<(BitDepth−1)) and p[x]=pTemp[x]−pTemp[0] (for x from 1 to "inSize−1").

In the above condition H, "BitDepth" is a bit depth of a color component of a sample (e.g., Y component) in the coding block 300. The symbol "<<" is a bit shifting symbol used in the ITU-T H.265 standard.

Alternatively, the intra prediction unit can derive array p[x] (for x from 0 to "inSize−1" based on the following conditions I and J.

[CONDITION I] If "mipSizeId" is 2, p[x]=pTemp[x+1]−pTemp[0].

[CONDITION J] Otherwise (e.g., "mipSizeId" is less than 2), p[0]=(1<<(BitDepth−1))−pTemp[0] and p[x]=pTemp[x]−pTemp[0] (for x from 1 to "inSize−1").

In some embodiments, the intra prediction unit can determine the values of array p[x] by using a unified calculation method without judging the value of "mipSizeId." For example, the intra prediction unit can append "(1<<(BitDepth−1))" as an additional element in "pTemp," and calculate p[x] as "pTemp[x]−pTemp[0]."

In some embodiment, the parameter "1<<(BitDepth−1)" can be a constant. In some embodiment, the parameter "1<<(BitDepth−1)" can be shown as "2^(BitDepth−1)." Accordingly, parameters "p[0] and "p[x]" can be calculated based on the equations P-1, P-2 and P-3 below.

$$\begin{cases} p[0] = pTemp[0] - (1 << (BitDepth - 1)) \\ p[x] = pTemp[x] - pTemp[0] \end{cases} \quad \text{for } x = 1, \ldots, inSize - 1 \tag{P-1}$$

$$\begin{cases} p[0] = (1 << (BitDepth - 1)) - pTemp[0] \\ p[x] = pTemp[x] - pTemp[0] \end{cases} \quad \text{for } x = 1, \ldots, inSize - 1 \tag{P-2}$$

$$p[x] = pTemp[x + 1] - pTemp[0] \tag{P-3}$$

$$\text{for } x = 0, \ldots, inSize - 1$$

Equations P-1 and P-2 apply to cases where "mipSizeId" is equal to "0" or "1," which means that the selected size parameter is within the predetermined range. After determining that the selected size parameter of a current block is in the predetermined range, "1<<(BitDepth−1)" can be determined. Then a difference between "1<<(BitDepth−1)" and "pTemp[0]" can be determined. The difference is then set as p[0]. Then p[x] can be calculated based on the equations P-1 and P-2 above.

Equation P-3 applies to cases where the "mipSizeId" is equal to "2," which means the selected size parameter is not within the predetermined range. Assuming that the current block is a 4×4 block, which means that there four values in buffer area "pTemp." These four values are pTemp[0], pTemp[1], pTemp[2], and pTemp[3]. Based on equation P-3 above and these four values, array "p[x]" can be determined. Values in array "p[x]" can be called MIP input samples.

Step 302

In Step 302, the intra prediction unit (or the prediction module 301) derives the MIP prediction of the coding block 300 by using the group of reference samples 32, 34 and an MIP matrix. The MIP matrix is selected from a group of predefined MIP matrices based on its corresponding MIP mode identifier (i.e., variable "mipModeId") and the MIP size identifier (i.e. variable "mipSizeId").

The MIP prediction derived by the intra prediction unit includes partial predicted samples 35 of all or partial sample positions in the coding block 300. The MIP prediction is denoted as "predMip[x][y]."

In the illustrated embodiment in FIG. 3, partial predicted samples 35 are samples marked as grey squares in the current block 300. The reference samples 32, 34 in array p[x] derived in Step 301 are used as an input to the prediction module 301. The prediction module 301 calculates the partial predicted samples 35 by using the MIP matrix and a shifting parameter. The shifting parameter includes a shifting offset parameter ("fO") and a shifting number parameter ("sW"). In some embodiment, the prediction module 301 derives the partial predicted sample 35 with its coordinate (x, y) based on the following equations (B) and (C):

$$oW = (1 << (sW-1)) - fO * (\Sigma_{i=0}^{inSize-1} p[i]) \quad (B)$$

$$predMip[x][y] = (((\Sigma_{i=0}^{inSize-1} mWeight[i][y*predSize+x] * p[i]) + oW) >> sW) + pTemp[0] \text{ (for } x \text{ from 0 to "predSize-1", for } y \text{ from 0 to "predSize-1"} \text{)} \quad (C)$$

In equation (B) above, parameter "fO" is a shifting offset parameter which is used to determine parameter "oW" or an offset value. Parameter "sW" is a shifting number parameter. "p[i]" is reference sample. Symbol ">>" is a binary right shifting operator as defined in the H.265 standard.

In equation (C) above, "mWeight[i][j]" is an MIP weighting matrix in which matrix elements are fixed constants for both encoding and decoding. Alternatively, in some embodiments, an implementation of the encoding system 200 uses adaptive MIP matrix. For example, the MIP weighting matrix can be updated by various training methods using one or more coded pictures as input, or using pictures provided to the encoding system 200 by external means. The intra prediction unit can forward "mWeight[i][j]" to an entropy coding unit (e.g., the entropy coding unit 215) when an MIP mode is determined. The entropy coding unit can then write "mWeight[i][j]" in the bitstream, e.g. in one or more special data units in the bitstream containing MIP data. Correspondingly, in some embodiments, an implementation of a decoding system 400 with adaptive MIP matrix can update MIP matrix using, for example, training method with input of one or more coded pictures or blocks or pictures from other bitstream provided by external meanings, or obtained from parsing unit 401 by parsing special data units in the input bitstream containing MIP matrix data.

The prediction unit 301 can determine the values of "sW" and "fO" based on the size of the current block 300 and the MIP mode used for the current block 300. In some embodiments, the prediction unit 301 can obtain the values of "sW" and "fO" by using a look-up table. For example, Table 1 below can be used to determine "sW."

TABLE 1

| | sW | | | | | | | | | | | | | | | | | | |
|---|---|---|---|---|---|---|---|---|---|---|---|---|---|---|---|---|---|---|---|
| | modeId | | | | | | | | | | | | | | | | | | |
| MipSizeId | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 6 | 5 | 6 | 5 | 5 |
| 1 | 6 | 6 | 6 | 6 | 6 | 6 | 6 | 6 | 6 | 7 | | | | | | | | |
| 2 | 7 | 5 | 6 | 6 | 6 | 6 | | | | | | | | | | | | |

In some embodiments, the shifting number parameter "sW" can be set as a first fixed value, such as 5 or 6. In such embodiments, there is no need to use Table 1 above to look up the value of the shifting number parameter "sW." For example, when "mipSizeId" is equal to "0" or "2," the shifting number parameter "sW" can be set as "5." As another example, when "mipSizeId" is equal to "2," the shifting number parameter "sW" can be set as "5." Table 2 below shows different settings of the shifting number parameter "sW." In some embodiments, the shifting number parameter "sW." can be set by the prediction module 301.

TABLE 2

| MipSizeId | sW |
|---|---|
| 0 | 5 |
| 1 | 6 |
| 2 | 5 |

In some embodiments, the prediction module can set "sW" as a constant. For example, the prediction module can "sW" as "5" for blocks of various sizes with different MIP modes. As another example, the prediction module 301 can set "sW" as "6" for blocks of various sizes with different MIP modes. As yet another example, the prediction module can set "sW" as "7" for blocks of various sizes with different MIP modes.

In some embodiments, the prediction unit 301 can use Table 3 below to determine the shifting offset parameter "fO."

TABLE 3

| | fO |
|---|---|
| | modeId |

| MipSizeId | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | 34 | 19 | 7 | 32 | 27 | 24 | 21 | 13 | 24 | 15 | 27 | 20 | 16 | 7 | 20 | 23 | 21 | 24 |
| 1 | 17 | 20 | 11 | 21 | 17 | 11 | 23 | 10 | 21 | 11 | | | | | | | | |
| 2 | 8 | 46 | 16 | 10 | 13 | 11 | | | | | | | | | | | | |

In some embodiments, the shifting offset parameter "fO" can be set as a second fixed value, such as 23, 32, 46, 56, or 66. The second fixed value has a preferred range of 1-100. In such embodiments, there is no need to use Table 3 above to look up the value of the shifting offset parameter "fO." In some embodiments, the shifting offset parameter "fO" can be set based on parameter "mipSizeId." For example, when "mipSizeId" is equal to "0," the shifting offset parameter "fO" can be set as "34." As another example, when "mipSizeId" is equal to "1," the shifting offset parameter "fO" can be set as "23." As yet another example, when "mipSizeId" is equal to "1," the shifting offset parameter "fO" can be set as "46." Table 4 below shows different settings of the shifting offset parameter "fO." In some embodiments, the shifting offset parameter "fO" can be set by the prediction module 301.

TABLE 4

| MipSizeId | fO |
|---|---|
| 0 | 34 |
| 1 | 23 |
| 2 | 46 |

Referring to equation (B) above, when the shifting number parameter "sW" and the shifting offset parameter "fO" are set as fixed values, parameter "oW" can also be a constant, which improves the overall computing speed of the MIP process.

In some embodiments, the intra prediction unit can perform a "clipping" operation on the value of the MIP prediction samples stored in array "predMip." When "isTransposed" is 1 (or TRUE), the "predSize×preSize" array "predMip[x][y] (for x from 0 to "predSize-1; for y from 0 to "predSize-1") is transposed as "predTemp[y][x]=predMip[x][y]" and then "predMip=predTemp."

More particularly, when the size of the coding block 303 is "8×8" (i.e. both "cbWidth" and "cbHeight" are 8), the intra prediction unit can derive an "8×8" "predMip" array.

Step 303

In Step 303 in FIG. 3, the intra prediction unit derives predicted samples 37 of the remaining samples other than the partial samples 35 in the coding block 300. As shown in FIG. 3, the intra prediction unit can use the filtering module 302 to derive the predicted samples 37 of the remaining samples other than the partial samples 35 in the coding block 300. An input to the filtering module 302 can be the partial samples 35 in step 302. The filtering module 302 can use one or more interpolation filters to derive the predicted samples 37 of the remaining samples other than the partial samples 35 in the coding block 300. The intra prediction unit (or the filtering module 302) can generate a prediction (which includes multiple predicted samples 37) of the coding block 300 and store prediction 37 in an array "predSamples[x][y]" (for x from 0 to "nTbW-1," for y from 0 to "nTbH-1") according to the following conditions K and L.

[CONDITION K] If the intra prediction unit determines that "nTbW" is greater than "predSize" or that "nTbH" is greater than "predSize," the intra prediction unit initiates an upsampling process to derive "predSamples" based on "predMip."

[CONDITION L] Otherwise, the intra prediction unit sets the prediction of the coding block 300 as the MIP prediction of the coding block.

In other words, the intra prediction unit can set "predSamples[x][y] (for x from 0 to "nTbW-1", for y from 0 to "nTbH-1") being equal to "predMip[x][y]." For example, the intra prediction unit can set "predSamples" for a coding block with its size equal to "8×8" (i.e. both "cbWidth" and "cbHeight" are 8) as its "predMip[x][y]."

Through the Steps 301-303, the intra prediction unit can generate the prediction of the current block 300. The generated prediction can be used for further processed (e.g., the prediction block 23 discussed above with reference to FIG. 2).

Figure 4:
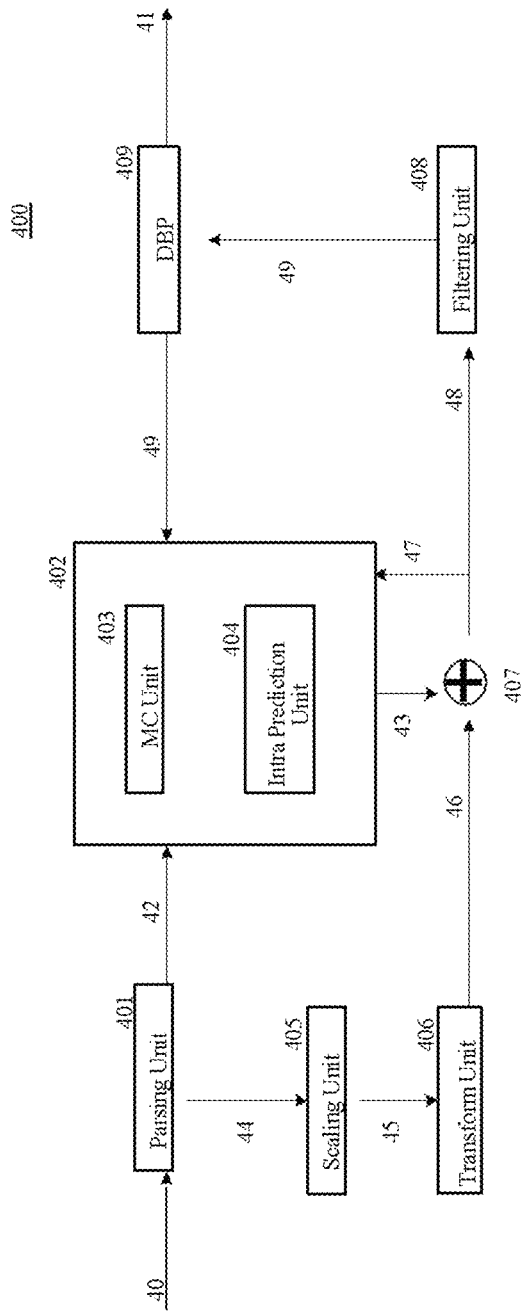
FIG. 4 is a schematic diagram of a decoding system according to an embodiment of the present disclosure.

FIG. 4 is a schematic diagram of a decoding system 400 according to an embodiment of the present disclosure. The decoding system 400 is configured to receive, process, and transform an input bitstream 40 to an output video 41. The input bitstream 40 can be a bitstream representing a compressed/coded picture/video. In some embodiments, the input bitstream 40 can be from an output bitstream (e.g., the output bitstream 21) generated by an encoding system (such as the encoding system 200).

The decoding system 400 includes a parsing unit 401 configured to parse the input bitstream 40 to obtain values of syntax elements therefrom. The parsing unit 401 also converts binary representations of the syntax elements to numerical values (i.e. a decoding block 42) and forwards the numerical values to a prediction unit 402 (e.g., for decoding). In some embodiments, the parsing unit 401 can also forward one or more variables and/or parameters for decoding the numerical values to the prediction unit 402.

The prediction unit 402 is configured to determine a prediction block 43 of the decoding block 42 (e.g., a CU or a partition of a CU, such as a transform block). When it is indicated that an inter coding mode was used to decode the decoding block 42, an MC (motion compensation) unit 403 of the prediction unit 402 can receive relevant parameters from the parsing unit 401 and accordingly decode under the inter coding mode. When it is indicated that an intra prediction mode (e.g., an MIP mode) is used to decode the decoding block 42, an intra prediction unit 404 of the prediction unit 402 receives relevant parameters from the parsing unit 401 and accordingly decodes under the indicated intra coding mode. In some embodiments, the intra prediction mode (e.g., the MIP mode) can be identified by a specific flag (e.g., an MIP flag) embedded in the input bitstream 40.

For example, when the MIP mode is identified, the intra prediction unit 404 can determine the prediction block 43 (which includes multiple predicted samples) based on the following methods (similar to the Steps 301-303 described in FIG. 3).

First, the intra prediction unit 404 derives one or more reference samples from neighboring samples of the decoding block 42 (similar to Step 301 in FIG. 3). For example, the intra prediction unit 404 can generate the reference samples by downsampling the neighboring samples, or directly extracting a portion from the neighboring samples.

The intra prediction unit 404 can then derive partial predicted samples in the decoding block 42 using the reference samples, an MIP matrix and a shifting parameter (similar to Step 302 in FIG. 3). In some embodiments, the positions of the partial predicted samples can be preset in the decoding clock 42. For example, the positions of the partial predicted samples can be positions with odd horizontal and vertical coordinate values within the coding block. The shifting parameter can include a shifting offset parameter and a shifting number parameter, which can be used in shifting operations in generating the partial predicted samples.

Finally, if the partial predicted samples of the decoding block 42 are derived, the intra prediction unit 404 derives predicted samples of the remaining samples other than the partial predicted samples in the decoding block 42 (similar to Step 303 in FIG. 3). For example, the intra prediction unit 404 can use an interpolation filter to derive the predicted samples, by using the partial predicted samples and the neighboring samples as inputs of the interpolation filter.

The decoding system 400 includes a scaling unit 405 with functions similar to those of the inverse quantization unit 210 of the encoding system 200. The scaling unit 405 performs scaling operations on quantized coefficients 44 (e.g., levels) from the parsing unit 401 so as to generate reconstructed coefficients 45.

A transform unit 406 has functions similar to those of the inverse transform unit 211 in the encoding system 200. The transform unit 406 performs one or more transform operations (e.g., inverse operations of one or more transform operations by the inverse transform unit 211) to get reconstructed residual 46.

An adder 407 adds the prediction block 43 from the prediction unit 402 and the reconstructed residual 46 from the transform unit 406 to get a reconstructed block 47 of the decoding block 42. The reconstructed block 47 is also sent to the prediction unit 402 to be used as a reference (e.g., for other blocks coded in an intra prediction mode).

After all the decoding block 42 in a picture or a subpicture have been reconstructed (i.e., a reconstructed block 48 is formed), a filtering unit 408 can perform an in-loop filtering on the reconstructed block 49. The filtering unit 408 contains one or more filters such as a deblocking filter, a sample adaptive offset (SAO) filter, an adaptive loop filter (ALF), a luma mapping with chroma scaling (LMCS) filter, a neural-network-based filter, etc. In some embodiments, the filtering unit 408 can perform the in-loop filtering on only one or more target pixels in the reconstructed block 48.

The filtering unit 408 then send a decoded picture 49 (or picture) or subpicture to a DPB (decoded picture buffer) 409. The DPB 409 outputs decoded pictures as the output video 41 based on timing and controlling information. Decoded pictures 49 stored in the DPB 409 can also be employed as a reference picture by the prediction unit 402 when performing an inter or intra prediction.

In some embodiment, the decoding system 400 can be a computing device with a processor and a storage medium recording one or more decoding programs. When the processor reads and executes the decoding programs, the decoding system 400 can receive an input video bitstream and generate corresponding decoded video.

In some embodiments, the decoding system 400 can be a computing device with one or more chips. The units or elements of the decoding system 400 can be implemented as integrated circuits on the chips.

Figure 5:
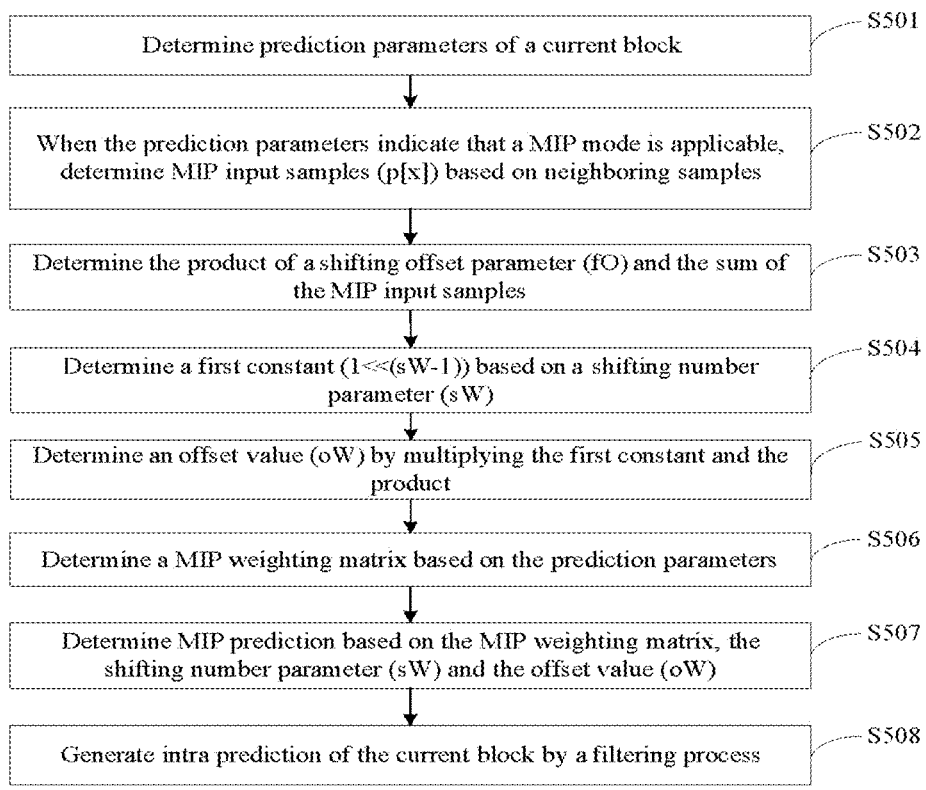
FIG. 5 is a flowchart illustrating a method an embodiment of the present disclosure.

FIG. 5 is a flowchart illustrating a method 500 in accordance with an embodiment of the present disclosure. At block 501, the method 500 starts by determining prediction parameters of a current block. In some embodiments, the prediction parameters include parameters for prediction (e.g., "predModeIntra" as defined in the H.265 standard) and size identifiers (e.g., "mipSizeId"). At block 502, when the prediction parameters indicate that an MIP mode is applicable, the method 500 continues to determine an MIP input sample (e.g., values in array "p[x]") based on neighboring samples. In some embodiments, the neighboring samples can include above-neighboring samples and/or left-neighboring samples.

At block 503, the method 500 continues to determine the product of a shifting offset parameter (fO) and the sum of the MIP input samplings. As shown in equation (B) above, the sum of the MIP input samplings can be "$\sum_{i=0}^{inSize-1} p[i]$," and therefore the product can be "$fO*(\sum_{i=0}^{inSize-1} p[i])$."

At block 503, the method 500 continues to determine a first constant based on a shifting number parameter (sW). As shown in equation (B) above, the first constant can be "$1<<(sW-1)$."

At block 504, the method 500 continues to determine an offset value (oW) by multiplying the first constant and the product. As shown in equation (B) above, the first offset value (oW) can be "$(1<(sW-1))-fO*(\sum_{i=0}^{inSize-1} p[i])$."

At block 505, the method 500 determines an MIP weighting matrix based on the prediction parameters. In equation (B) above, the MIP weighting matrix is matrix "mWeight." In some embodiments, the MIP weighting matrix can be generated based on various methods such as training processes involving machine learning (ML) or artificial intelligence (AI).

At block 507, the method 500 continues to determine MIP prediction based on the MIP weighting matrix, the shifting number parameter (sW) and the offset value (oW). The MIP prediction can be matrix "predMip[x][y]" as indicated in equation (C) above. In some embodiments, the MIP prediction can be determined as described in equation (C) above. In some embodiments, the MIP prediction matrix can be determined based on equation (D) below.

$$(D)$$

$$\begin{cases} predMip[x][y] = \left(\left(\left(\sum_{i=0}^{inSize-1} mWeight[i][y \times incH \times predC + x \times incW] \times \right.\right.\right. \\ \left.\left.\left. p[i]\right) + oW\right) >> sW\right) + pTemp[0] \\ oW = (1 << (sW-1)) - fO \times \left(\sum_{i=0}^{inSize-1} p[i]\right) \end{cases}$$

In equation (D) above, "[x][y]" are location coordinates of pixels. "x" is for the horizontal direction and "y" is for the vertical direction of the MIP prediction matrix. Parameters "incH," "predC," and "incW" are parameters for obtaining matrix values from the MIP weighting matrix. Other parameters in equation (D) have been discussed above with reference to equation (C).

In some embodiments, the shifting offset parameter (fO) can be set as "32" and the shifting number parameter (sW) can be set as 6. In such embodiments, the MIP prediction matrix can be determined based on equations (E) and (F) below.

$$\begin{cases} predMip[x][y] = \left(\left(\left(\sum_{i=0}^{inSize-1} mWeight[i][y \times incH \times predC + x \times incW] \times p[i]\right) + oW\right) >> 6\right) + pTemp[0] \\ oW = 32 - 32 \times \left(\sum_{i=0}^{inSize-1} p[i]\right) \end{cases} \quad (E)$$

$$\begin{cases} predMip[x][y] = \left(\left(\left(\sum_{i=0}^{inSize-1} mWeight[i][y \times predSize + x] \times p[i]\right) + oW\right) >> 6\right) + pTemp[0] \\ oW = 32 - 32 \times \left(\sum_{i=0}^{inSize-1} p[i]\right) \end{cases} \quad (F)$$

At block 508, the method 500 generates intra prediction of the current block by a filtering process based on the MIP prediction matrix. If the size of the MIP prediction matrix is the same as the size of the current block, then the method 500 can set the values in the MIP prediction matrix to the current block as its MIP intra prediction samples (e.g., "preSamples[x][y]"), as shown in Equation (G) below. If not, the method 500 can perform the filtering process to adjust the size of the MIP prediction matrix. In some embodiments, the filtering process can be a upsampling process or a low-pass filtering process. Embodiments of the upsampling process are discussed in detail above with reference to FIG. 3 (e.g., Step 303).

predSamples[x][y]=predMip[x][y]  (G)

Figure 6:
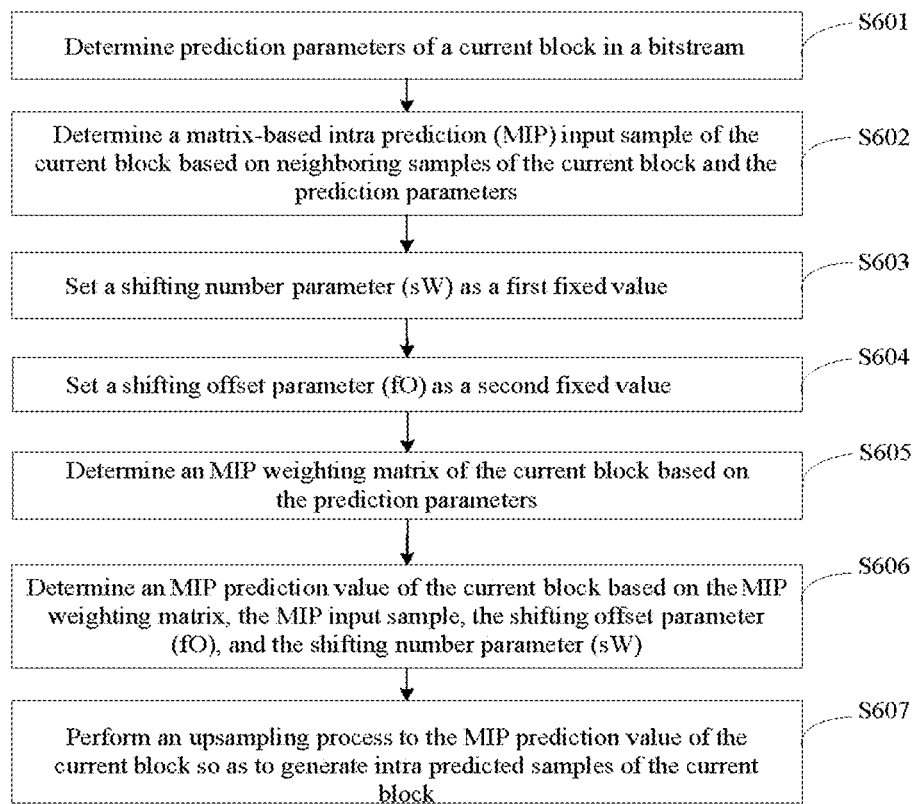
FIG. 6 is a flowchart illustrating a method an embodiment of the present disclosure.

FIG. 6 is a flowchart illustrating a method 600 in accordance with an embodiment of the present disclosure. At block 601, the method 600 starts by determining prediction parameters of a current block in a bitstream. In some embodiments, the prediction parameters can include "predModeIntra" and "mipSizeId" as defined in the H.265 standard.

At block 602, the method 600 continues by determining a matrix-based intra prediction (MIP) input sample of the current block based on neighboring samples of the current block and the prediction parameters. In some embodiments, the MIP input sample can be the values in array "p[x]." In some embodiments, the neighboring samples include a left-neighboring sample and/or an above-neighboring sample.

Embodiments of determining the MIP input sample are discussed above with reference to FIG. 3 (e.g., Step 301). For example, the method 600 can include performing a downsampling process to the neighboring samples to generate a temporary reference array (pTemp[x]) based on the size identifier.

At block 603, the method 600 continues by setting a shifting number parameter (sW) as a first fixed value. In some embodiments, first fixed value can be 5 or 6. At block 604, the method 600 continues by setting a shifting offset parameter (fO) as a second fixed value. In some embodiments, the second fixed value can be 23, 34, or 46.

When the first and second fixed values are set, a first constant "1<<(sW−1)" can be determined. An offset value (oW) can also be calculated (e.g., equation (B)).

At block 605, the method 600 continues by determining an MIP weighting matrix of the current block based on the prediction parameters. Embodiments of the MIP weighting matrix are discussed above with reference to FIG. 3 (e.g., Step 302).

At block 606, the method 600 continues by determining an MIP prediction sample (e.g., values in array "predMip[x][y]") of the current block based on the MIP weighting matrix, the MIP input sample, the shifting offset parameter (fO), and the shifting number parameter (sW). Embodiments of the MIP prediction sample are discussed above in detail with reference to equations (C), (D), (E), and (F).

At block 607, the method 600 continues by performing an upsampling process to the MIP prediction sample of the current block so as to generate intra predicted samples (e.g., "predSamples[x][y]") of the current block. In some embodiments, the MIP prediction sample of the current block can include prediction samples for at least a portion of sampling points of the current block. Embodiments of the MIP prediction samples and MIP weighting matrix are discussed above in detail with reference to equation (G) and FIG. 3 (e.g., Step 303).

Figure 7:
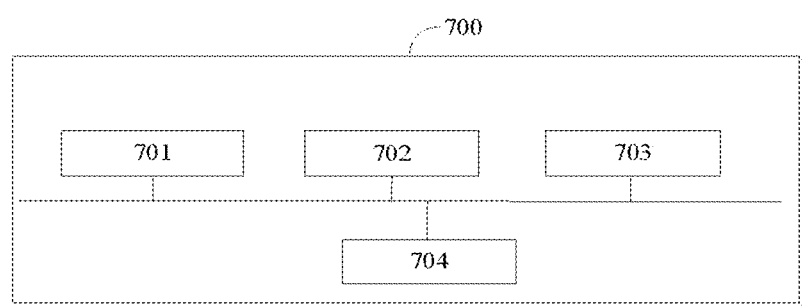
FIG. 7 is a schematic diagram of an apparatus (e.g., encoder) according to an embodiment of the present disclosure.

FIG. 7 is a schematic diagram of an encoder 700 according to an embodiment of the present disclosure. As shown, the encoder 700 includes a first determination unit 701, a first computing unit 702, and a first prediction unit 703. The first determination unit 701 is to configure prediction parameters of a current block and to determine an MIP input sample (e.g., values in array "p[x]"). In some embodiments, the MIP input sample can be determined based on neighboring samples. The prediction parameters include parameter indicative of which prediction model has been used (e.g., an MIP model) and corresponding parameters (e.g., a size identifier). The first determination unit 701 can also determine an MIP weighing matrix. The first computing unit 702 is configured to compute an offset value (e.g., "oW" discussed above) based on a shifting number parameter (e.g., "sW") and a shifting offset parameter (e.g., "fO"). The first prediction unit 703 is to generate MIP prediction of the current block based on the MIP weighing matrix, the offset value, the shifting number parameter, and the shifting offset parameter.

In some embodiments, the encoder 700 includes a first inquiry unit 704 is configured to determine an MIP model of a current block. In such embodiments, the first determination unit 701 determines an MIP model index of the current block. The first inquiry unit 704 can then obtain corresponding parameters (e.g., sW, fO, MIP size identifier, etc.) based on the MIP model index.

In the present disclosure, the term "unit" can be a processor, circuitry, software, module, or a combination thereof. In some embodiments, the "unit" can be an integrated component such as a SoC (system on chip). In some embodiments, the "unit" can include a set of instructions stored in a storage media such as a disk, a hard drive, a memory, and so on.

Figure 8:
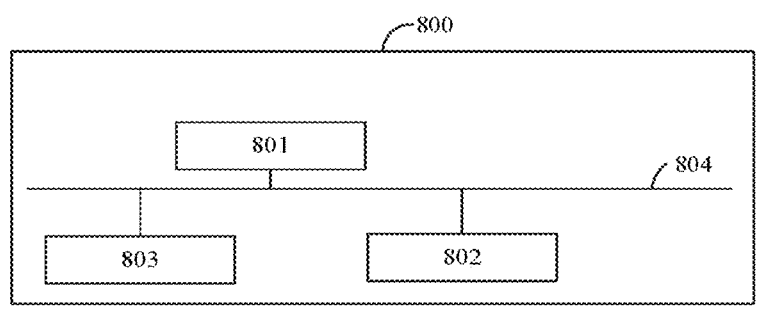
FIG. 8 is a schematic diagram of an apparatus (e.g., encoder) according to an embodiment of the present disclosure.

FIG. 8 is a schematic diagram of an encoder 800 according to an embodiment of the present disclosure. The encoder 800 can include a first communication interface 801, a first storage device 802, and a first processor 803 coupled by a first system bus 804. The first system bus 804 can include power lines, control lines, and/or signal lines. The first communication interface 801 is configured to communicate with other external devices by transmitting and receiving signals. The first storage device 802 is configured to store data, information, and/or instructions (such of the steps discussed in FIGS. 5 and 6) that can be performed by the first processor 803.

The first processor 803 can be a chip, an integrated circuit, or other devices that can process signals. The first processor 803 can be a general-purpose processor, a digital signal processor (DSP), an application specific integrated circuit (ASIC), a field programmable gate array (FPGA), programmable logic device (PLD), or other suitable logic components.

Figure 9:
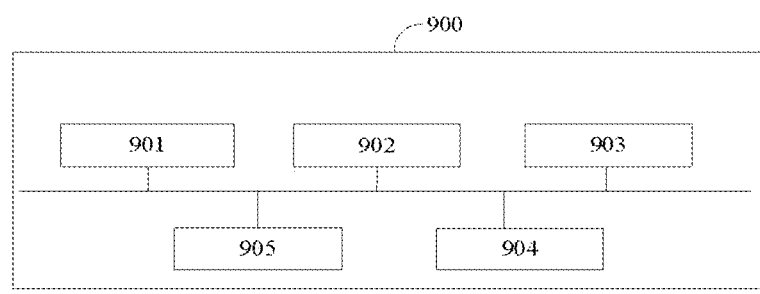
FIG. 9 is a schematic diagram of an apparatus (e.g., decoder) according to an embodiment of the present disclosure.

FIG. 9 is a schematic diagram of a decoder 900 according to an embodiment of the present disclosure. As shown, the decoder 900 includes an analytic unit 901, a second computing unit 902, a second prediction unit 903, a second prediction unit 904, and a second inquiry unit 905. The analytic unit 901 is configured to parse a bitstream so as to obtain prediction parameters of a current block. The second determination unit 902 is to configure suitable prediction parameters of the current block and to determine an MIP input sample (e.g., values in array "p[x]"). In some embodiments, the MIP input sample can be determined based on neighboring samples. The prediction parameters include parameter indicative of which prediction model has been used (e.g., an MIP model) and corresponding parameters (e.g., a size identifier). The second determination unit 903 can also determine an MIP weighing matrix. The second computing unit 904 is configured to compute an offset value (e.g., "oW") based on a shifting number parameter (e.g., "sW") and a shifting offset parameter (e.g., "fO"). The second prediction unit 904 is to generate MIP prediction of the current block based on the MIP weighing matrix, the offset value, the shifting number parameter, and the shifting offset parameter.

In some embodiments, the second inquiry unit 905 is configured to determine an MIP model of a current block. In such embodiments, the second determination unit 902 determines an MIP model index of the current block. The second inquiry unit 904 can then obtain corresponding parameters (e.g., sW, fO, MIP size identifier, etc.) based on the MIP model index.

Figure 10:
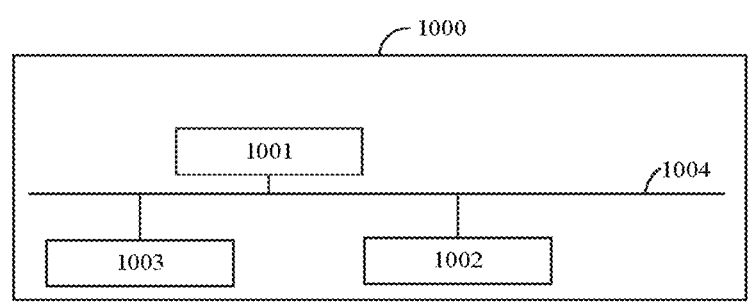
FIG. 10 is a schematic diagram of an apparatus (e.g., decoder) according to an embodiment of the present disclosure.

FIG. 10 is a schematic diagram of a decoder 1000 according to an embodiment of the present disclosure. The decoder 1000 can include a second communication interface 1001, a second storage device 1002, and a second processor 1003 coupled by a second system bus 1004. The second system bus 1004 can include power lines, control lines, and/or signal lines. The second communication interface 1001 is configured to communicate with other external devices by transmitting and receiving signals. The second storage device 1002 is configured to store data, information, and/or instructions (such of the steps discussed in FIGS. 5 and 6) that can be performed by the second processor 1003.

The second processor 1003 can be a chip, an integrated circuit, or other devices that can process signals. The second processor 1003 can be a general-purpose processor, a digital signal processor (DSP), an application specific integrated circuit (ASIC), a field programmable gate array (FPGA), programmable logic device (PLD), or other suitable logic components.

Figure 11:
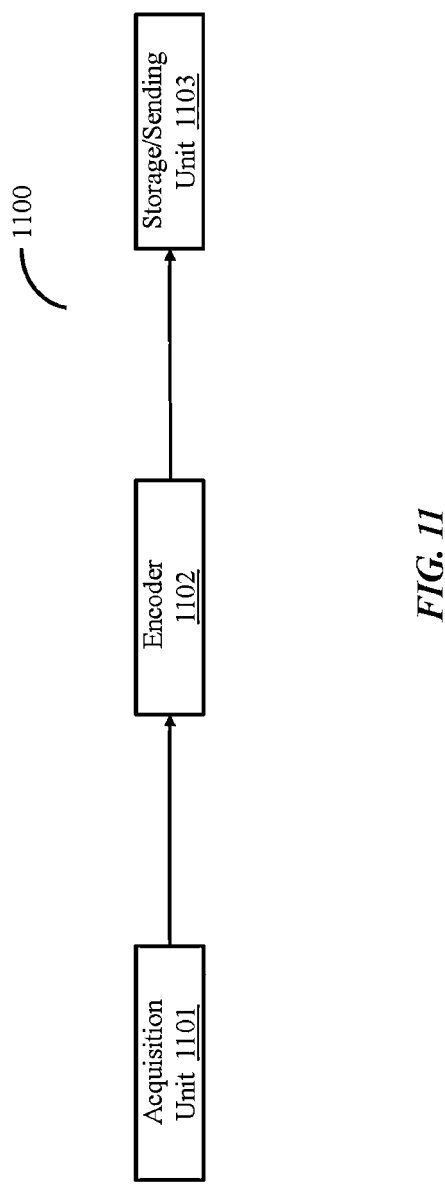
FIG. 11 is a schematic diagram of an apparatus (e.g., encoder) according to an embodiment of the present disclosure.

FIG. 11 is a schematic diagram of an apparatus 1100 according to an embodiment of the present disclosure. The apparatus 1100 can be a "sending" apparatus. More particularly, the apparatus 1100 is configured to acquire, encode, and store/send one or more pictures. The apparatus 1100 includes an acquisition unit 1001, an encoder 1102, and a storage/sending unit 1103.

The acquisition unit 1101 is configured to acquire or receive a picture and forward the picture to the encoder 1102. The acquisition unit 1101 can also be configured to acquire or receive a video consisting of a sequence of pictures and forward the video to the encoder 1102. In some embodiments, the acquisition unit 1101 can be a device containing one or more cameras (e.g., picture cameras, depth cameras, etc.). In some embodiments, the acquisition unit 1101 can be a device that can partially or completely decode a video bitstream to generate a picture or a video. The acquisition unit 1101 can also contain one or more elements to capture audio signal.

The encoder 1102 is configured to encode the picture from the acquisition unit 1101 and generates a video bitstream. The encoder 1102 can also be configured to encode the video from the acquisition unit 1101 and generates the bitstream. In some embodiment, the encoder 1102 can be implemented as the encoding system 200 described in FIG. 2. In some embodiments, the encoder 1102 can contain one or more audio encoders to encode audio signals to generate an audio bitstream.

The storage/sending unit 1103 is configured to receive one or both of the video and audio bitstreams from the encoder 1102. The storage/sending unit 1103 can encapsulate the video bitstream together with the audio bitstream to form a media file (e.g., an ISO-based media file) or a transport stream. In some embodiments, the storage/sending unit 1103 can write or store the media file or the transport stream in a storage unit, such as a hard drive, a disk, a DVD, a cloud storage, a portable memory device, etc. In some embodiments, the storage/sending unit 1103 can send the video/audio bitstreams to an external device via a transport network, such as the Internet, a wired network, a cellular network, a wireless local area network, etc.

Figure 12:
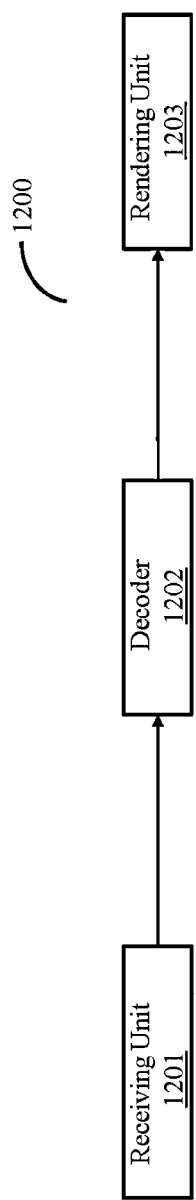
FIG. 12 is a schematic diagram of an apparatus (e.g., decoder) according to an embodiment of the present disclosure.

FIG. 12 is a schematic diagram of an apparatus 1200 according to an embodiment of the present disclosure. The apparatus 1200 can be a "destination" apparatus. More particularly, the apparatus 1200 is configured to receive, decode, and render picture or video. The apparatus 1200 includes a receiving unit 1201, a decoder 1202, and a rendering unit 1203.

The receiving unit 1201 is configured to receive a media file or a transport stream, e.g., from a network or a storage device. The media file or the transport stream includes a video bitstream and/or an audio bitstream. The receiving unit 1201 can separate the video bitstream and the audio bitstream. In some embodiments, the receiving unit 1201 can generate a new video/audio bitstream by extracting the video/audio bitstream.

The decoder 1202 includes one or more video decoders such as the decoding system 400 discussed above. The decoder 1202 can also contain one or more audio decoders. The decoder 1202 decodes the video bitstream and/or the audio bitstream from the receiving unit 1201 to get a decoded video file and/or one or more decoded audio files (corresponding to one or multiple channels).

The rendering unit 1203 receives the decoded video/audio files and processes the video/audio files to get suitable video/audio signal for displaying/playing. These adjusting/reconstructing operations can include one or more of the following: denoising, synthesis, conversion of color space, upsampling, downsampling, etc. The rendering unit 1203 can improve qualities of the decoded video/audio files.

Figure 13:
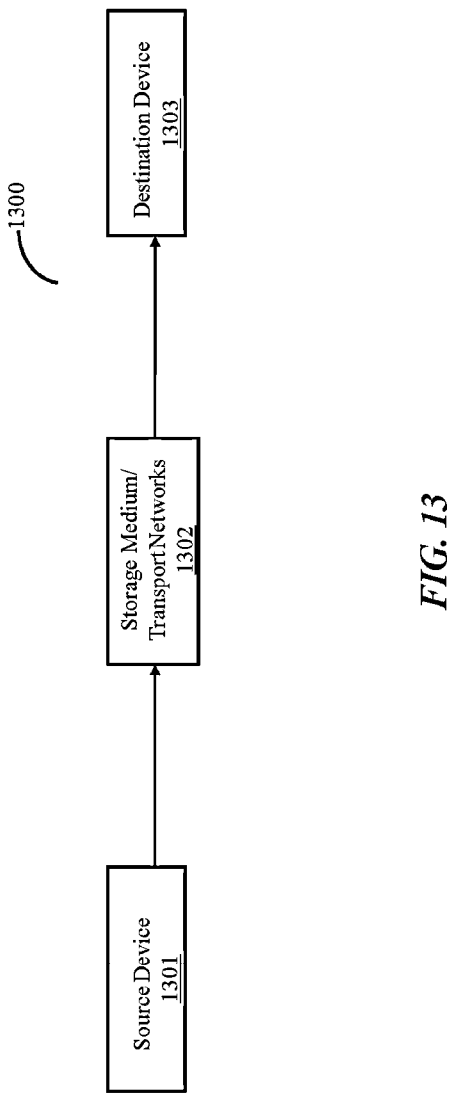
FIG. 13 is a schematic diagram of a communication system according to an embodiment of the present disclosure.

FIG. 13 is a schematic diagram of a communication system 1300 according to an embodiment of the present disclosure. The communication system 1300 includes a source device 1301, a storage medium or transport network 1302, and a destination device 1303. In some embodiments, the source device 1301 can be the apparatus 1100 described above with reference to FIG. 11. The source device 1301 sends media files to the storage medium or transport network 1302 for storing or transporting the same. The destination device 1303 can be the apparatus 1200 described above with reference to FIG. 12. The communication system 1300 is configured to encode a media file, transport or store the encoded media file, and then decode the encoded media file. In some embodiments, the source device 1301 can be a first smartphone, the storage medium 1302 can be a cloud storage, and the destination device can be a second smartphone.

The above-described embodiments are merely illustrative of several embodiments of the present disclosure, and the description thereof is specific and detailed. The above embodiments cannot be construed to limit the present disclosure. It should be noted that, a number of variations and modifications may be made by those skilled in the art without departing from the spirit and scope of the disclosure. Therefore, the scope of the present disclosure should be subject to the appended claims.

The invention claimed is:

1. A method for predicting an image, comprising:
    determining prediction parameters of a current block in a bitstream;
    determining a matrix-based intra prediction (MIP) input sample of the current block based on neighboring samples of the current block and the prediction parameters,
    setting a shifting number parameter (sW) as a first fixed value, wherein the first fixed value is set independently of the prediction parameters, and the first fixed value is 6;
    setting a shifting offset parameter (fO) as a second fixed value wherein the second fixed value is set independently from the first fixed value, and wherein the second fixed value is set independently of the prediction parameters, and the second fixed value is 32;
    determining an MIP prediction sample (predMip[x][y]) of the current block based on an MIP weight matrix, the MIP input sample, the shifting offset parameter (fO), and the shifting number parameter (sW); and
    performing an upsampling process to the MIP prediction sample of the current block so as to generate intra predicted samples (predSamples[x][y]) of the current block.

2. The method of claim 1, wherein the MIP prediction sample of the current block includes prediction values for a portion of samples of the current block.

3. The method of claim 1, wherein the neighboring samples include a left-neighboring sample.

4. The method of claim 1, wherein the neighboring samples include an above-neighboring sample.

5. The method of claim 1, further comprising:
    determining a first constant value based on the shifting number parameter (sW), the first constant value being "1<<(sW−1)".

6. The method of claim 1, further comprising:
    determining an offset value (oW) based on the MIP input sample, the shifting number parameter (sW), and the shifting offset parameter (fO).

7. The method of claim 1, wherein the prediction parameters include a size identifier (mipSizeId) of the current block.

8. The method of claim 7, further comprising:
    performing a downsampling process to the neighboring samples to generate a temporary reference array (pTemp[x]) based on the size identifier.

9. The method of claim 8, further comprising:
    determining a second constant value based on a bit depth (BitDepth) of the neighboring samples, in an event that the size identifier is in a predetermined range.

10. The method of claim 9, further comprising:
    generating the MIP input sample (p[x]) based on the second constant value and the temporary array (pTemp [x]), the second constant value being "1<<(BitDepth−1)".

11. A decoding apparatus for decoding a picture, comprising: a processor and a memory configured to store instructions executable by the processor;
    wherein the processor is configured to:
        parse a bitstream to determine a prediction mode of a coding block;
        determine a matrix-based intra prediction (MIP) input sample of the coding block based on neighboring samples of the coding block and prediction parameters of the coding block;
        set a shifting number parameter (sW) as a first fixed value, wherein the first fixed value is set independently of the prediction parameters, and the first fixed value is 6;
        set a shifting offset parameter (fO) as a second fixed value wherein the second fixed value is set independently from the first fixed value, and wherein the second fixed value is set independently of the prediction parameters, and the second fixed value is 32;
        determine an MIP weight matrix of the coding block based on the prediction parameters;
        determine an MIP prediction sample of the coding block based on the MIP weight matrix, the MIP input sample, the shifting offset parameter (fO), and the shifting number parameter (sW); and
        perform an upsampling process to the MIP prediction sample so as to generate intra predicted samples of the coding block.

12. The decoding apparatus of claim 11, wherein the MIP prediction sample of the current block includes prediction values for a portion of samples of the current block.

13. The decoding apparatus of claim 11, the processor is further configured to:
    determine a first constant value based on the shifting number parameter (sW), the first constant value being "1<<(sW−1)".

14. The decoding apparatus of claim 11, the processor is further configured to:
    determine an offset value (oW) based on the MIP input sample, the shifting number parameter (sW), and the shifting offset parameter (fO).

15. The decoding apparatus of claim 11, wherein the prediction parameters include a size identifier (mipSizeId) of the current block.

16. An encoding apparatus for encoding a picture, comprising: a processor and a memory configured to store instructions executable by the processor;

wherein the processor is configured to:
  receive an input picture and divide the input picture into one or more coding blocks;
  determine a matrix-based intra prediction (MIP) input sample of the coding block based on neighboring samples of the coding block and prediction parameters of the coding block;
  set a shifting number parameter (sW) as a first fixed value, wherein the first fixed value is set independently of the prediction parameters, and the first fixed value is 6;
  set a shifting offset parameter (fO) as a second fixed value wherein the second fixed value is set independently from the first fixed value, and wherein the second fixed value is set independently of the prediction parameters, and the second fixed value is 32;
  determine an MIP weight matrix of the coding block based on the prediction parameters;
  determine an MIP prediction sample of the coding block based on the MIP weight matrix, the MIP input sample, the shifting offset parameter (fO), and the shifting number parameter (sW); and
  perform an upsampling process to the MIP prediction sample so as to generate intra predicted samples of the coding block.

17. The encoding apparatus of claim 16, wherein the MIP prediction sample of the current block includes prediction values for a portion of samples of the current block.

18. The encoding apparatus of claim 16, the processor is further configured to:
  determine a first constant value based on the shifting number parameter (sW), the first constant value being "1<<(sW−1)".

19. The encoding apparatus of claim 16, the processor is further configured to:
  determine an offset value (oW) based on the MIP input sample, the shifting number parameter (sW), and the shifting offset parameter (fO).

20. The encoding apparatus of claim 16, wherein the prediction parameters include a size identifier (mipSizeId) of the current block.

* * * * *